United States Patent
MacDonald et al.

(10) Patent No.: US 10,190,616 B2
(45) Date of Patent: Jan. 29, 2019

(54) ROOF COVER FASTENER

(71) Applicant: Celcore Incorporated, Black Mountain, NC (US)

(72) Inventors: William R. MacDonald, Flagler Beach, FL (US); Peter C. Garrigus, Bryan, OH (US); Derek J. Krueger, Archbold, OH (US)

(73) Assignee: CELCORE INCORPORATED, Black Mountain, NC (US)

( * ) Notice: Subject to any disclaimer, the term of this patent is extended or adjusted under 35 U.S.C. 154(b) by 130 days.

(21) Appl. No.: 15/396,744

(22) Filed: Jan. 2, 2017

(65) Prior Publication Data
US 2017/0191519 A1    Jul. 6, 2017

Related U.S. Application Data

(60) Provisional application No. 62/274,497, filed on Jan. 4, 2016.

(51) Int. Cl.
*F16B 43/00* (2006.01)
*F16B 25/00* (2006.01)
(Continued)

(52) U.S. Cl.
CPC .......... *F16B 25/0026* (2013.01); *E04D 5/144* (2013.01); *F16B 25/103* (2013.01); *F16B 43/00* (2013.01); *E04B 7/00* (2013.01)

(58) Field of Classification Search
CPC .... F16B 25/0026; F16B 25/103; F16B 43/00; E04D 5/144; E04D 5/145; E04D 7/00
(Continued)

(56) References Cited

U.S. PATENT DOCUMENTS 1,435,134 A    11/1922   Ernst
2,056,688 A *  10/1936   Peterka ................... F16B 35/04
                                                    411/399
(Continued)

FOREIGN PATENT DOCUMENTS

CN    301566358      6/2011
DE    4342262 C2    11/1995
(Continued)

OTHER PUBLICATIONS http://www.bestmaterials.com/detail.aspx?ID=17660 Available Dec. 23, 2016 (Year: 2016).

*Primary Examiner* — Roberta S Delisle
(74) *Attorney, Agent, or Firm* — PatentFile, LLC; Bradley C. Fach; Steven R Kick

(57) ABSTRACT

A roof cover fastener may include a cover plate having a planar body with a perimeter. A central aperture may be disposed centrally in the body. A first annular rib may be formed into the body and may encircle the central aperture. A second annular rib may be formed into the body and may encircle the first annular rib. A first channel may separate the first annular rib from the second annular rib. A medial aperture may be disposed in the channel between the first annular rib and the second annular rib. The fastener may also include an auger element having a first end and a second end. A head may be coupled to the first end, and a tip may be coupled to the second end. A thread crest with a thread root may extend from the second end towards the first end.

19 Claims, 9 Drawing Sheets

(51) Int. Cl.
*F16B 25/10* (2006.01)
*E04D 5/14* (2006.01)
*E04B 7/00* (2006.01)

(58) Field of Classification Search
USPC .................. 411/411, 424, 531, 533, 545
See application file for complete search history.

(56) References Cited

U.S. PATENT DOCUMENTS

| | | | |
|---|---|---|---|
| 3,136,206 A | 6/1964 | Adams | |
| D237,681 S | 11/1975 | Bartlett et al. | |
| 4,282,050 A | 8/1981 | Thiis-Evensen | |
| D263,678 S | 4/1982 | Dewey | |
| D263,927 S | 4/1982 | Dewey | |
| D263,928 S | 4/1982 | Dewey | |
| 4,361,997 A | 12/1982 | DeCaro | |
| D271,662 S | 12/1983 | Jones | |
| 4,455,804 A | 6/1984 | Francovitch | |
| 4,467,581 A | 8/1984 | Francovitch | |
| 4,476,660 A | 10/1984 | Francovitch | |
| 4,520,606 A | 6/1985 | Francovitch | |
| 4,574,551 A | 3/1986 | Giannuzzi | |
| 4,620,402 A | 11/1986 | Beneze | |
| 4,621,963 A * | 11/1986 | Reinwall | F16B 5/0275 411/369 |
| 4,627,207 A | 12/1986 | Young et al. | |
| 4,658,558 A | 4/1987 | Verble | |
| 4,686,808 A | 8/1987 | Triplett | |
| 4,708,559 A | 11/1987 | Locotos | |
| 4,726,164 A | 2/1988 | Reinwall et al. | |
| 4,727,699 A | 3/1988 | Sargent | |
| 4,751,802 A | 6/1988 | Whitman | |
| 4,777,775 A | 10/1988 | Verble | |
| 4,787,188 A | 11/1988 | Murphy | |
| 4,799,845 A | 1/1989 | Hrysko | |
| 4,907,927 A | 3/1990 | Choiniere | |
| 4,945,699 A | 8/1990 | Murphy | |
| 4,999,963 A | 3/1991 | Verble | |
| 5,018,329 A | 5/1991 | Hasan et al. | |
| 5,082,412 A | 1/1992 | Thomas | |
| 5,125,779 A | 6/1992 | Hallock et al. | |
| 5,139,379 A | 8/1992 | Hasan et al. | |
| 5,242,736 A | 9/1993 | Erden et al. | |
| 5,267,423 A | 12/1993 | Giannuzzi | |
| 5,295,774 A * | 3/1994 | Roberts | B21H 3/027 411/387.2 |
| 5,452,553 A | 9/1995 | Clapp et al. | |
| 5,707,191 A | 1/1998 | Hempfling et al. | |
| 5,709,059 A | 1/1998 | Murphy et al. | |
| 5,778,623 A | 7/1998 | Powell | |
| 5,803,693 A * | 9/1998 | Choiniere | E04D 5/145 405/302.1 |
| 5,908,278 A | 6/1999 | Hasan et al. | |
| 5,951,225 A | 9/1999 | Osterle et al. | |
| 6,095,737 A | 8/2000 | Barker et al. | |
| 6,109,850 A * | 8/2000 | Commins | F16B 25/0031 411/387.2 |
| 6,205,730 B1 | 3/2001 | Hasan et al. | |
| 6,616,391 B1 * | 9/2003 | Druschel | F16B 25/0015 411/187 |
| 6,665,991 B2 | 12/2003 | Hasan | |
| 6,722,095 B2 | 4/2004 | Kobetsky | |
| 6,952,902 B2 | 10/2005 | Yaros | |
| 7,040,850 B2 | 5/2006 | Gaudron | |
| 7,413,392 B2 | 8/2008 | Nebesnak et al. | |
| D586,207 S | 2/2009 | Giddings | |
| D590,702 S | 4/2009 | Giddings | |
| 7,631,468 B2 * | 12/2009 | Gong | E04D 5/145 411/162 |
| 7,832,173 B2 * | 11/2010 | Crawford | E04C 3/16 411/387.1 |
| D636,503 S | 4/2011 | Parziale et al. | |
| 8,166,720 B2 | 5/2012 | Garrigus et al. | |
| D696,931 S | 1/2014 | Rodenhouse et al. | |
| D696,932 S | 1/2014 | Rodenhouse et al. | |
| 8,631,629 B1 | 1/2014 | Wiener | |
| D739,039 S | 9/2015 | Gomes | |
| D748,973 S | 2/2016 | Rodenhouse et al. | |
| D755,622 S | 5/2016 | Rodenhouse et al. | |
| 9,377,045 B2 * | 6/2016 | Su | F16B 25/103 |
| D781,175 S | 3/2017 | Jankowski | |
| 9,709,086 B2 * | 7/2017 | Gong | F16B 25/103 |
| 2003/0033780 A1 | 2/2003 | Hasan | |
| 2004/0148888 A1 | 8/2004 | Kuhn et al. | |
| 2004/0168396 A1 | 9/2004 | Kuhn et al. | |
| 2004/0170489 A1 | 9/2004 | Nebesnak et al. | |
| 2005/0166503 A1 | 8/2005 | Panasik | |
| 2005/0183348 A1 | 8/2005 | Kuhn et al. | |
| 2006/0185289 A1 | 8/2006 | Gong et al. | |
| 2007/0224389 A1 | 9/2007 | Panasik et al. | |
| 2007/0237606 A1 * | 10/2007 | Takasaki | F16B 25/0015 411/387.2 |
| 2009/0173028 A1 * | 7/2009 | Garrigus | E04D 5/142 52/410 |
| 2010/0233416 A1 | 9/2010 | Parziale | |
| 2010/0326006 A1 * | 12/2010 | Yaros | E04D 5/145 52/711 |

FOREIGN PATENT DOCUMENTS

| | | |
|---|---|---|
| DE | 4207445 C2 | 9/1996 |
| DE | 202012006047 U1 | 8/2012 |
| EP | 0276708 B1 | 10/1990 |
| EP | 0467070 B1 | 12/1994 |
| FR | 2675529 | 10/1992 |
| GB | 2142108 A | 1/1985 |
| JP | 2015531439 | 2/2015 |
| WO | 1996011311 A1 | 4/1996 |
| WO | 2009090332 A1 | 7/2009 |

* cited by examiner

ROOF COVER FASTENER

CROSS REFERENCE TO RELATED APPLICATIONS

This application claims priority to and the benefit of the filing date of U.S. Provisional Application No. 62/274,497, filed on Jan. 4, 2016, entitled "ROOF COVER FASTENER", which is hereby incorporated by reference in its entirety.

APPENDIX TO THE SPECIFICATION

This application contains an appendix labeled as "Appendix-A", the entire contents of which are hereby incorporated by reference.

FIELD OF THE INVENTION

This patent specification relates to the field of fasteners. More specifically, this patent specification relates to fasteners for lightweight insulating concrete and other nail-able roof deck materials.

BACKGROUND

Lightweight insulating concrete is a type of cast in place roof deck used in low slope roof designs. Many types of roofing materials used to waterproof, insulate, and/or re-cover these roof deck installations require fastener attachment for adequate wind uplift resistance. Currently, the most common type of fasteners used to attach roofing to these deck types are impact installed. Impact fasteners however provide relatively low, per part, withdrawal resistance values from the parent roof deck and demonstrate a wide range of withdrawal resistance variability. Accordingly, very dense fastening patterns are required to achieve proper attachment for wind uplift resistance of the roof cover. Auger screw type fasteners are also an available option but have found minimal commercial success in these applications as they often require pre-drilling for proper installation. Auger screw fasteners that claim not to require pre-drilling are awkward and cumbersome to install. They also utilize a single, relatively large diameter auger resulting in a limited value of withdrawal resistance.

Therefore, there is a need for a fastener that attaches roof materials to lightweight insulating concrete and other nail-able roof deck materials; that provides substantial and uniformed withdrawal resistance; that can be installed without impact; can be properly installed without the requirement of pre-drilling the parent deck and can be installed using multiple auger embeds through a single fastener stress plate.

BRIEF SUMMARY OF THE INVENTION

A roof cover fastener which attaches roof materials to roof deck materials, such as lightweight insulating concrete and other nail-able roof deck materials, is provided. The roof cover fastener may be used for a plurality of roofing and construction purposes including to secure layers of roofing, insulation, or recovery board to the parent deck which would not by themselves provide a water proof layer of construction. The roof cover fastener may be installed without impact and does not require pre-drilling of the roof materials for proper attachment making them a less labor intensive and a more favorable option. A roof cover fastener may include a cover plate having a planar body with a perimeter. A central aperture may be disposed centrally in the body. A first annular rib may be formed into the body and may encircle the central aperture. A second annular rib may be formed into the body and may encircle the first annular rib. A first channel may separate the first annular rib from the second annular rib, and the first annular rib and second annular rib may extend above the first channel. A medial aperture may be disposed in the channel between the first annular rib and the second annular rib. The fastener may also include an auger element having a thread root and thread crest with a first end and a second end. A head may be coupled to the first end of the auger element, and a tip may be coupled to the second end of the auger element. A thread crest may extend, fully or partially, from the second end towards the first end.

In some embodiments, a roof cover fastener may include two or more, such as a plurality, of auger elements installed through the cover plate for enhanced attachment of roof materials to roof deck materials, thereby lessening the overall number of cover plates required for a particular fastening pattern, while providing an assembled per part, maximum withdrawal resistance. Multiple auger elements may be installed through a single cover plate to provide resilience for the attachment when these fasteners are installed in a rigid non-resilient roof deck material like insulating concrete.

In some embodiments, a roof cover fastener may include a cover plate configured to be placed in contact with a roof material that is to be coupled to a roof deck material. One or more apertures may extend through the cover plate which may each be configured to receive a portion of an auger element having a thread crest. The thread crest of the auger element may be configured to be inserted through an aperture and rotary driven through the roof material and into roof deck material thereby securing the cover plate to the roof material and the roof deck material.

In some embodiments, the cover plate and auger element of the fastener may be installed upon a roof deck material and a roof cover or roof material would thereafter be thermally welded, or attached by adhesive, to the cover plate from above. Accordingly, there are two preferred ways in which the fastener may be used to secure roof materials to roof deck materials, such as by placing the cover plate upon the roofing materials and through fastening an auger element into the roof deck materials, and by installing the cover plate and auger element directly to the roof deck material or through other roofing materials and then attached an above deck cover roofing material to the cover plate by thermal welding or adhesive attachment.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
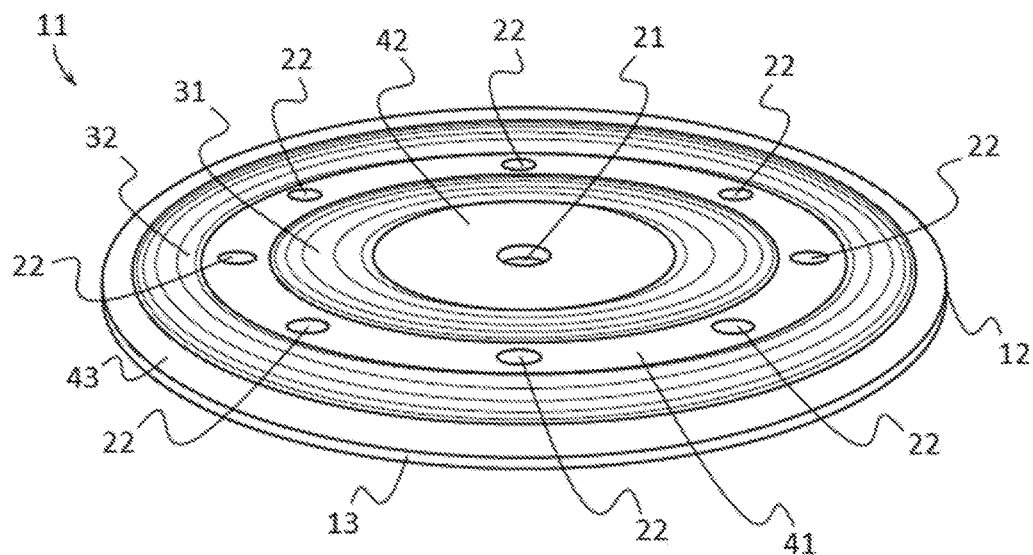
FIG. 1 depicts a top perspective view of an example of a cover plate of a roof cover fastener according to various embodiments described herein.
Figure 2:
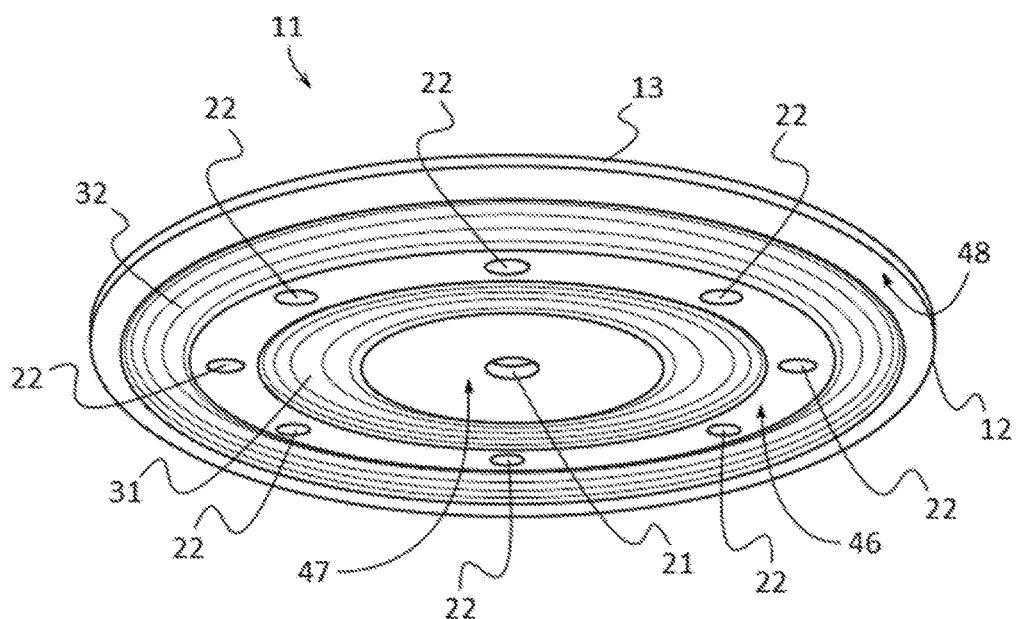
FIG. 2 illustrates a bottom perspective view of an example of a cover plate of a roof cover fastener according to various embodiments described herein.
Figure 3:
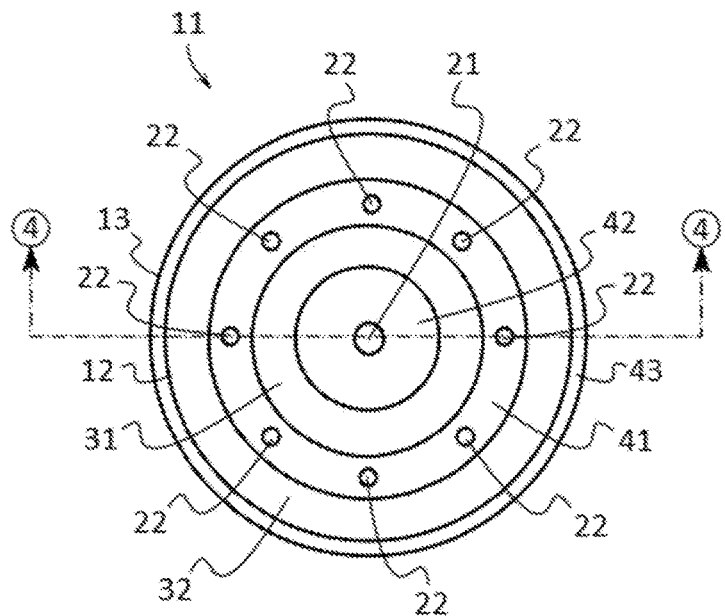
FIG. 3 shows a top plan view of an example of a cover plate of a roof cover fastener according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

New roof cover fasteners that are able to attach roof materials and roof deck materials are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-4 illustrate an example of a cover plate 11 of a roof cover fastener ("the fastener") 100 (FIGS. 5 and 6) that may be used to attach roof materials 201, such as anchor sheets, base sheets, base plies, rigid insulation board, thermal barriers, recovery boards, single-ply membrane, other above deck materials, components, and the like, to nail-able roof deck materials 202, such as various types of lightweight insulating concrete, structural cement wood fiber, gypsum, and the like, according to various embodiments. In some embodiments, the fastener 100 may comprise a cover plate 11 having a planar body 12 with a perimeter 13. The body 12 may comprise a central aperture 21 which may be disposed centrally in the body 12. A first annular rib 31 may be formed into the body 12 which may encircle the central aperture 21. A second annular rib 32 may be formed into the body 12 which may encircle the first annular rib 31. A first channel 41 may separate the first annular rib 31 from the second annular rib 32, and the first annular rib 31 and second annular rib 32 may extend above the first channel 41. A medial aperture 22 may be disposed in the first channel 41 between the first annular rib 31 and the second annular rib 32.

As shown in FIGS. 11-15, the fastener 100 (FIGS. 5 and 6) may also comprise an auger element 51 having a thread formed by a thread crest 61 and a thread root 52 with a first end 53 and a second end 54. A head 55 may be coupled to the first end 53 of the thread root 52 and thread crest 61, and a tip 56 may be coupled to the second end 54 of the thread root 52 and thread crest 61. The thread crest 61 may extend, fully or partially, from the second end 54 towards the first end 53. The fastener 100 may be used to secure roofing materials 201 to the parent deck which may comprise nail-able roof deck materials 202. The body 12 may be placed upon the roofing material 201 and a selected number of auger elements 51 may be installed through one or more central apertures 21 and/or medial apertures 21 and the roof material 201 into the roof deck material 202 using a rotary tool such as a drill. The auger elements 51 may be installed through one or more of the central apertures 21 and/or medial apertures 21 of the body 12. In preferred embodiments, auger elements 51 may be installed through two or more medial apertures 22 in a symmetrical pattern. In other embodiments, one or more auger elements 51 may be installed through any of the one or more medial apertures 22 and/or central aperture 21. Additionally, the roof cover fastener 100 may be used for a plurality of roofing and construction purposes including to secure layers of roofing, insulation, or recovery board to the parent deck 202 which would not by themselves provide a water proof layer of construction.

In some embodiments, the cover plate 11 and auger element 51 of the fastener 100 may be installed upon a roof deck material 202 and a roof cover or roof material 201 would thereafter be thermally welded, or attached by adhesive, to the cover plate 11 from above. In further embodiments, thermal welding may be performed by way an inductive coating which may be applied to the cover plate 11. In other embodiments, adhesive attachment may be performed by forming the cover plate 11 from or coupling to the cover plate 11 an adhesive adhere-able fabric or other adhesive adhere-able material. Accordingly, there are two preferred ways in which the fastener 100 may be used to secure roof materials 201 to roof deck materials 202, such as by placing the cover plate 11 upon the roofing materials 201 and through fastening an auger element 51 into the roof deck materials 202, and by installing the cover plate 11 and auger element 51 directly to the roof deck material 202 or through other roofing materials 201 and then attached an above deck cover roofing material 201 to the cover plate 11 by thermal welding or adhesive attachment.

Referencing FIGS. 1-3, and 5, in some embodiments, the body 12 of the cover plate 11 may comprise a generally circular shape. Preferably, the body 12 may be made of a substantially rigid sheet of material, such as sheet metal, which may be press formed or stamped to provide one or more annular ribs 31, 32, and/or one or more channels 41, 42, 43. In further embodiments, the body 12 may be made from or comprise galvalume coated steel, stainless steel, other metals and metal alloys, hard plastics, such as nylon, acrylic, uPVC, HDPE, melamine, hard rubbers, fiberglass, carbon fiber, resins, such as epoxy resin, ceramics, or any other material including combinations of materials that are substantially rigid and suitable for securing roof materials. In still further embodiments, the body 12 may be made from or comprise an adhesive adhere-able fabric or other adhesive adhere-able material such as a mesh type pattern or loose weave synthetic fabrics such as polyester, polyamide, acrylic, nylon, rayon, acetate, spandex, lastex, and natural fabrics such as coir, cotton, terry cloth, hemp, jute, linen, ramie, wool, silk, plastic mesh or plastic grid materials, or any other suitable flexible natural or synthetic material including combinations of materials which may be thermally welded or adhere-able.

Figure 7:
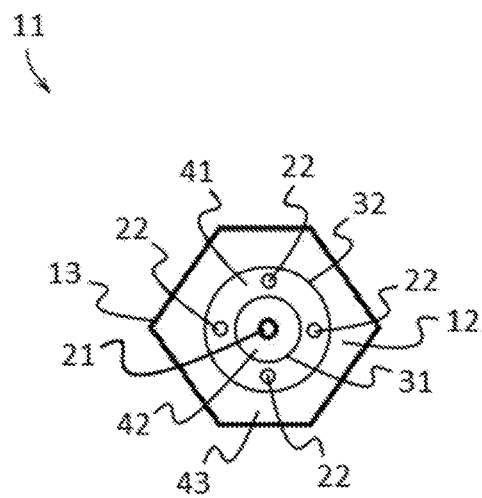
FIG. 7 depicts a top plan view of an alternative example of a roof cover fastener according to various embodiments described herein.
Figure 8:
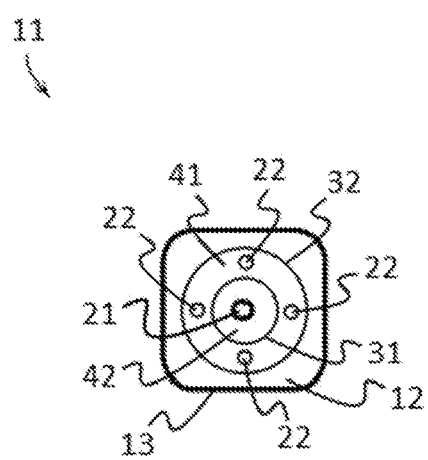
FIG. 8 illustrates a top plan view of another alternative example of a roof cover fastener according to various embodiments described herein.
Figure 9:
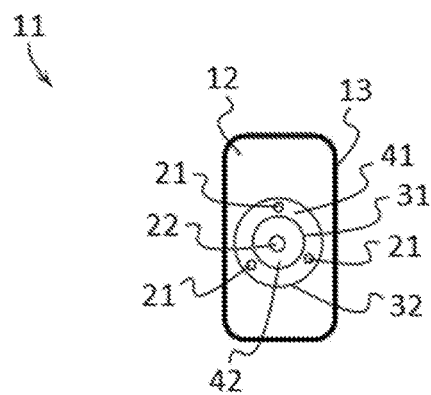
FIG. 9 shows a top plan view of a further alternative example of a roof cover fastener according to various embodiments described herein.
Figure 10:
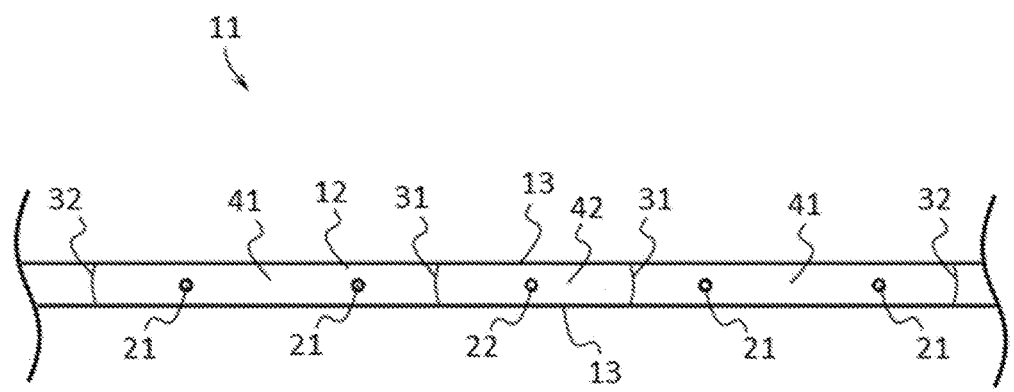
FIG. 10 depicts a top plan view of another further alternative example of a roof cover fastener according to various embodiments described herein.

In alternative embodiments, the body 12 may be configured with a generally hexoganal shape (FIG. 7), a generally square shape (FIG. 8), a generally rectangular shape (FIG. 9), and a generally elongated shape (FIG. 10). It should be understood to one of ordinary skill in the art that the body 12 may be configured in a plurality of sizes and shapes including "T" shaped, "X" shaped, oval shaped, octagon shaped, nonagon shaped, decagon shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

In some embodiments, the fastener 100 may comprise a central aperture 21 disposed centrally in the body 12 which may extend through the body 12. The central aperture 21 may allow portions of an auger element 51 to pass through the body 12. In preferred embodiments, the central aperture 21 may be complementary in shape to portions of an auger element 51, such as the thread root 52, shank 57, and/or thread crest 61, thereby allowing the central aperture 21 to engage portions of an auger element 51 inserted therein. In further embodiments, a central aperture 21 may be generally circular in shape. In alternative embodiments, a central aperture 21 may comprise a generally, rectangular, triangular, oval, hexagonal shape, or any other shape allowing the central aperture 21 to receive an auger element 51.

Figure 4:
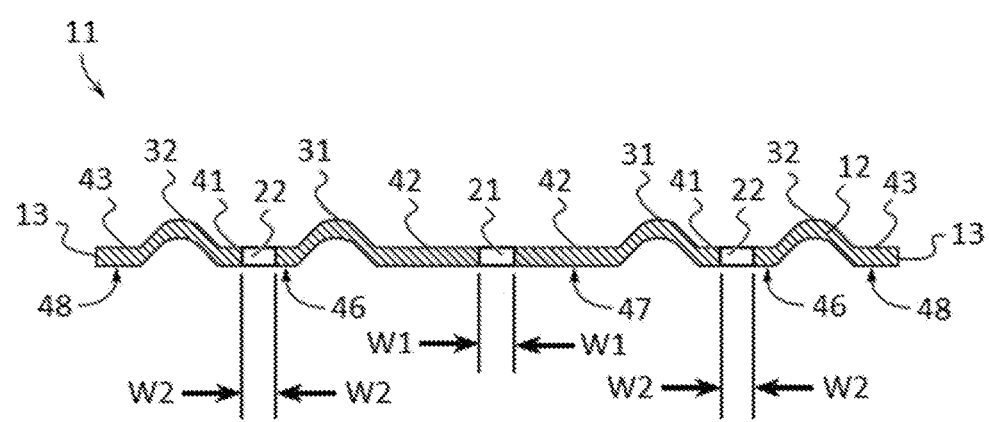
FIG. 4 depicts a sectional, through line 4-4 shown in FIG. 3, elevation view of an example of a cover plate of a roof cover fastener according to various embodiments described herein.
Figure 5:
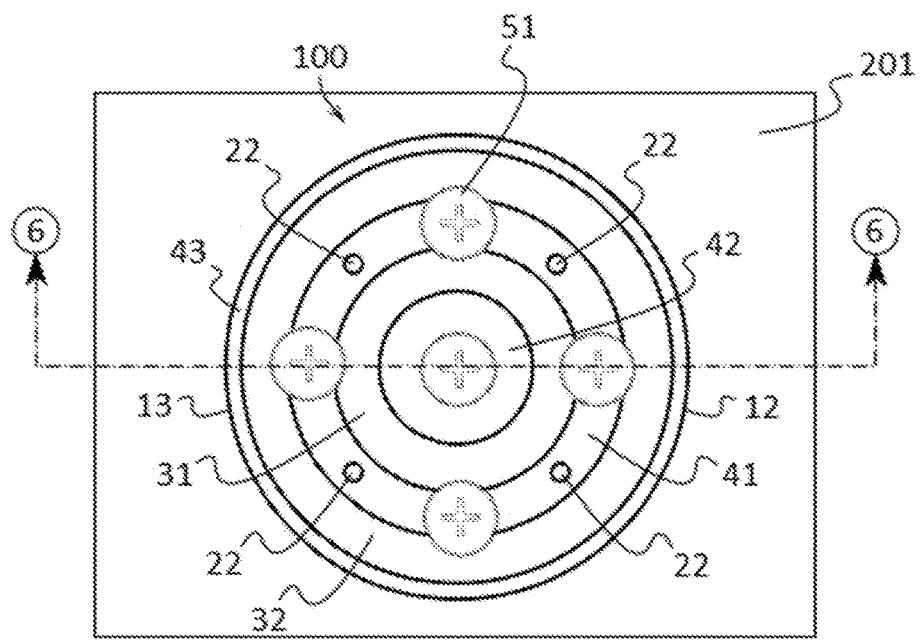
FIG. 5 illustrates top plan view of an example of a roof cover fastener secured to a roof material according to various embodiments described herein.
Figure 6:
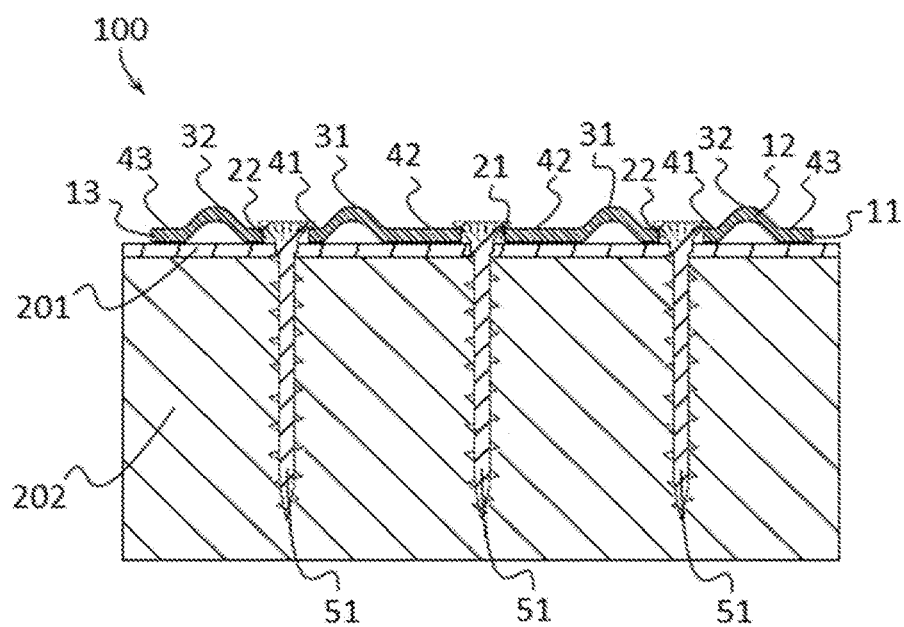
FIG. 6 shows a sectional, through line 6-6 shown in FIG. 5, elevation view of an example of a roof cover fastener attaching roof materials to a nail-able roof deck material according to various embodiments described herein.

As perhaps best shown in FIGS. 4 and 6, the fastener 100 may comprise one or more annular ribs 31, 32, which may extend above one or more channels 41, 42, 43. In some embodiments, one or more annular ribs 31, 32, may be embossed or pressed into the body 12 thereby creating the annular ribs 31, 32, and also defining one or more channels 41, 42, 43, above which the annular ribs 31, 32, may extend. Preferably, each channel 41, 42, 43, on the body 12 may comprise a contact surface 46, 47, 48, which may contact the roof material that the fastener 100 is desired to contact. A contact surface 46, 47, 48, may be generally flat planar and may optionally comprise texturing, such as ridges, bumps, or any other friction enhancing texturing. In further embodiments, the first channel 41 may comprise a first contact surface 46, the second channel 42 may comprise a second contact surface 47, and the third channel 43 may comprise a third contact surface 48. When the fastener 100 is placed in contact with a roof material 201, one or more contact surfaces 46, 47, 48, of one or more channels 41, 42, 43, may serve at the point of contact between the fastener 100 and the roof material 201. In further preferred embodiments, when the fastener 100 is placed in contact with a roof material 201, the annular ribs 31, 32, may extend away from the roof material 201 and therefore above the channels 41, 42, 43, which the fastener 100 may comprise.

In some embodiments, the body 12 may comprise a second channel 42 which may be formed into the body 12. Optionally, the second channel 42 may encircle the central aperture 21 so that the second channel 42 may also be disposed centrally on the body 12. Preferably, the second channel 42 may be positioned within the first annular rib 31 which may be formed into the body 12 and encircling the central aperture 21. In further embodiments, the body 12 may comprise a third channel 43 which may be formed into the body 12 and which may be continuous with the perimeter 13. Preferably, the third channel 43 may encircle the second annular rib 32, and the first annular rib 31 and second annular rib 32 may extend above the third channel 43. Optionally, the third channel 43 may encircle the central aperture 21 so that the third channel 43 may also be disposed centrally on the body 12.

In some embodiments, the fastener 100 may comprise one or more ribs 31, 32, and channels 41, 42, 43, which may be concentrically positioned on the body 12 preferably in an alternating fashion. For example, the fastener 100 may comprise a first annular rib 31 and a first channel 41 which may be concentrically positioned on the body 12 relative to each other with the first annular rib 31 encircled by the first channel 41. In another example, the first annular rib 31 may be encircled by the first channel 41, and the first channel 41 may be encircled by the second annular rib 31 with the first annular rib 31, first channel 41, and second annular rib 32 concentric with each other. In a further example, the fastener 100 may comprise a first annular rib 31, a second annular rib 32, a first channel 41, a second channel 42, and a third channel 43 concentrically positioned on the body 12 relative to each other. The second channel 42 may be encircled by the first annular rib 31, which may be encircled by the first channel 41, which may be encircled by the second annular rib 32, and which may be encircled by the third channel 43. In alternative embodiments, one or more annular ribs and channels may be positioned anywhere on the body 12.

In some embodiments, the fastener 100 may comprise a medial aperture 22 disposed in the first channel 41 between the first annular rib 31 and the second annular rib 32 which may extend through the body 12. The medial aperture 22 may allow portions of an auger element 51 to pass through the body 12. In preferred embodiments, the medial aperture 22 may be complementary in shape to portions of an auger element 51, such as the thread root 52, shank 57, and/or thread crest 61, thereby allowing the medial aperture 22 to engage portions of an auger element 51 inserted therein. In further embodiments, a medial aperture 22 may be generally circular in shape. In alternative embodiments, a medial aperture 22 may comprise a generally, rectangular, triangular, oval, hexagonal shape, or any other shape allowing the medial aperture 22 to receive an auger element 51.

In some embodiments, the fastener 100 may comprise two, three, four, five, six, seven, eight, nine, ten, or more medial apertures 22 disposed anywhere on the body 12. In preferred embodiments, the fastener 100 may comprise two or more medial apertures 22 disposed in the first channel 41 between the first annular rib 31 and the second annular rib 32. In further embodiments, one or more medial apertures 22 disposed in the body 12, such as in the first channel 41, may be symmetrically positioned relative to the other medial apertures 22 disposed in the body 12. For example, the body 12 may comprise eight medial apertures 22 positioned in a circular orientation with the arc between each medial aperture 22 being generally equidistant, thereby forming a symmetrical positioning. In other examples, medial apertures 22 may be positioned on the body 12 in symmetrical triangular, rectangular, pentagonal, hexagonal, heptagonal, octagonal, nonagonal, decagonal, or any other shape preferably with at least one line of symmetry. In still further embodiments, two or more medial apertures 22 may be disposed in the body 12, such as in the first channel 41, may be equidistant from the central aperture 21.

Referring now to FIG. 4, the central aperture 21 may comprise a width dimension W1 which may describe the narrowest width of the central aperture 21. For a generally, circular shaped central aperture 21, W1 may be constant, however for central apertures 21 with other shapes, such as rectangular, triangular, or hexagonal, W1 will refer to the smallest cross sectional width dimension. Similarly, a medial aperture 22 may comprise a width dimension W2 which may describe the narrowest width of the medial aperture 22. For a generally, circular shaped medial aperture 22, W2 may be constant, however for medial apertures 22 with other shapes, such as rectangular, triangular, or hexagonal, W2 will refer to the smallest cross sectional width dimension. In some embodiments, W1 of the central aperture 21 may be equal to, larger than, or smaller than the W2 of the medial apertures 22. In further embodiments, the W2 of each medial aperture 22 may be equal to the W2 of the other medial apertures 22.

Figure 11:
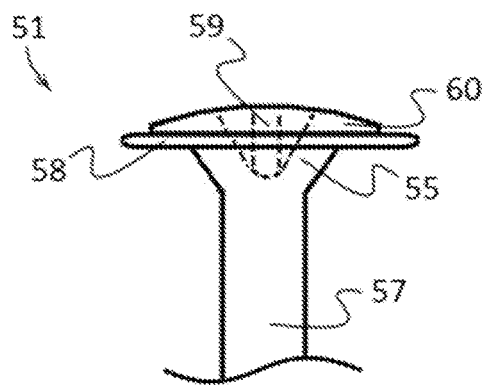
FIG. 11 illustrates a partial side elevation view of an example of the first end of an auger element according to various embodiments described herein.
Figure 12:
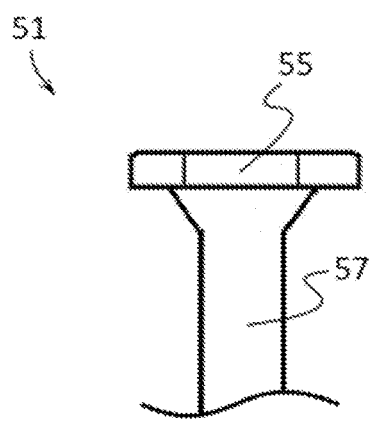
FIG. 12 shows a partial side elevation view of another alternative example of the first end of an auger element according to various embodiments described herein
Figure 15:
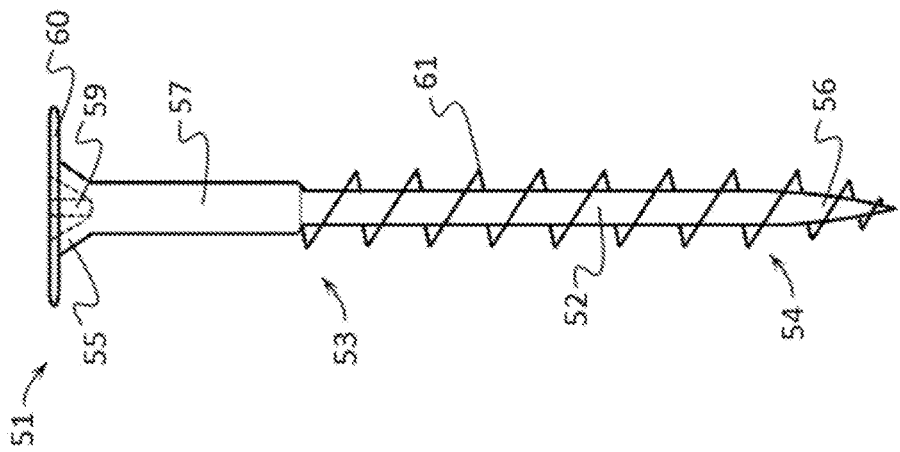
FIG. 15 shows a side elevation view of an alternative example of an auger element according to various embodiments described herein.
Figure 14:
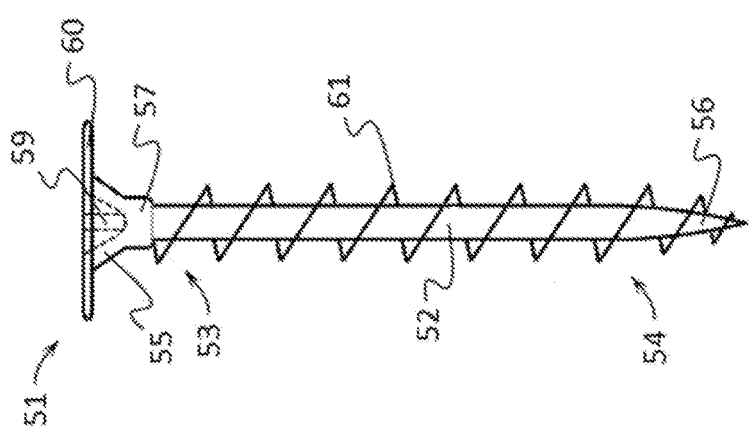
FIG. 14 illustrates a side elevation view of an example of an auger element according to various embodiments described herein.

Turning now to FIGS. 11-15, exemplary embodiments of auger elements 51 which may be used with the fastener 100 are shown. The auger elements 51 may be manufactured with various lengths and widths. FIGS. 14 and 15 also illustrate that the auger elements 51 may be configured as having a full thread 61 (FIG. 14) or having a less than full thread 61 (FIG. 15). FIG. 11 illustrates an exemplary embodiment showing that an auger element 51 may have a washer 58 coupled to the head 55 and a Phillips style drive recess 59 which may be used to receive Phillips style bits for driving the auger element 51. FIG. 12 shows a partial side elevation view of another alternative example of the first end 53 of an auger element 51 which comprises a hexagonal shaped head 55, similar to a machine bolt, which may be received by a complementary sized hexagonal socket for driving the auger element 51. FIGS. 14 and 15 depict auger elements 51 comprising a counter sunk type head 55 with a Phillips style drive recess 59 for generally flush fitting installations. In alternative embodiments, an auger element 51 may comprise any other type or style of head which may be used to tighten and drive or loosen and remove an auger element 51. Additionally, auger elements 51 may comprise any other type of threaded or non-threaded fastener. In further embodiments, the head 55 of the auger elements 51 may be embossed or textured in a manner that frictionally engages the surface of the body 12 at contact during rotary installation, minimizing the potential of over driving.

In some embodiments, an auger element 51 may comprise a first end 53 and a second end 54. A head 55 may be coupled to the first end 53 and a tip 56 may be coupled to the second end 54. Optionally, the head 55 may comprise a flange 60 which may contact the body 12 to arrest the auger element 51 as it travels through a central aperture 21 or a medial aperture 22. A thread crest 61 and thread root 52 may extend, fully or partially, from the second end 54 towards the first end 53. In some embodiments, a second end 54 may coupled to a shank 57 which may couple the thread root 52 and thread crest 61 to the head 55. A shank 57 may be configured with a plurality of lengths, such as relatively short, as shown in the example of FIG. 14, and relatively long, as shown in FIG. 15. In further embodiments and as shown in FIG. 15, a thread crest 61 may extend from the second end 54 towards the first end 53 and terminate before the head 55, such as at the shank 57. A shank 57 may be generally cylindrical in shape and may comprise a width less than, equal to, or greater than the width of the thread root 52 and/or thread crest 61. In some embodiments, the shank 57 may be generally cylindrical in shape and may comprise a width of 0.145 to 0.157 inches.

In some embodiments, the thread crest 52 may be generally cylindrical for the majority of its length, such as between the first end 53 and the second end 54. The thread root 52 may comprise a width dimension W3 (FIG. 13) which may describe the width of the thread root 52 between the first end 53 and the second end 54. In some embodiments, the W3 of the thread root 52 may be 0.117 to 0.135 inches. A conical tip 56 may be coupled to the second end 54. In some embodiments, the tip 56 may be tapered between 15 and 45 degrees relative to the thread root 52 and/or thread crest 61. In further embodiments, the tip 56 may be tapered between 25 and 30 degrees relative to the thread root 52 and/or thread crest 61. A thread crest 61 may be formed with a thread root 52, and optionally to the tip 56, which may be a helical structure used to convert between rotational and linear movement or force. The thread crest 61 may be a ridge wrapped around a thread root 52 in the form of a helix as a straight thread, and around the conical tip 56 as a tapered thread. The thread crest 61 may extend away from the thread root 52 and may comprise a width dimension W4 (FIG. 13) which may describe the width of the thread crest 61, such as between the first end 53 and the second end 54. In some embodiments, the thread crest 61 may comprise a width dimension W4 that is constant from the first end 53 to the second end 54. In further embodiments, the W4 of the thread crest 61 may be 0.24 to 0.26 inches. In still further embodiments, the shank 57 may comprise a diameter of 0.12 inches to 0.28 inches. In further embodiments, the W3 of the thread root 52 may comprise a diameter of 0.08 inches to 0.18 inches. In even further embodiments, the W4 of the thread crest 61 may comprise a diameter of 0.125 inches and 0.325 inches. In further embodiments, the ratio of W3 to W4 may be approximately 1:1.95 plus or minus 20 percent. In still further embodiments, the ratio of the width of the shank 57 to the W4 may be approximately 1:1.7 plus or minus 20 percent. These ratio ranges allow an auger element 51 to embed into roof materials 201 and nail-able roof deck materials 202 without a pre-drilling requirement.

Figure 13:
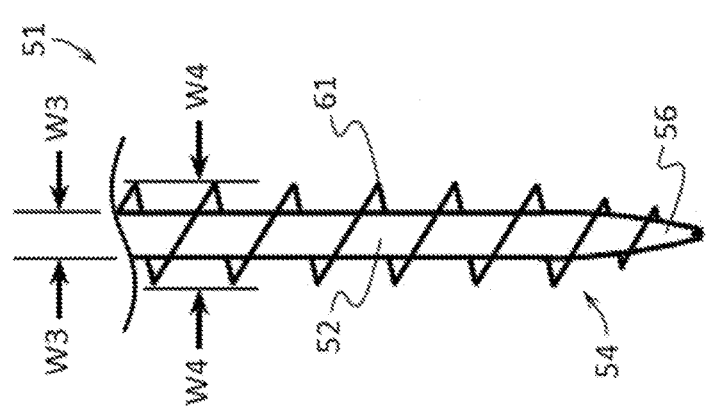
FIG. 13 depicts a partial side elevation view of an example of an auger element according to various embodiments described herein.

Referencing FIGS. 4, 6, and 13, in some embodiments, the central aperture 21 and/or one or more medial apertures 22 may be complementary in shape to portions of an auger element 51 thereby allowing the central aperture 21 and/or one or more medial apertures 22 to engage portions of an auger element 51 inserted therein. When the fastener 100 is placed in contact with a roof material 201, the contact surface 46 of one or more channels 41, 42, 43, may serve at the point of contact between the fastener 100 and the roof material 201 and one or more auger elements 51 may be inserted through the central aperture 21 and/or one or more medial apertures 22 and rotated so that the thread 61 may engage with roof materials 201 and nail-able roof deck materials 202. In further embodiments, one or more auger elements 51 may be inserted through one or more central apertures 21 and/or medial apertures 22 and rotated so that the thread 61 may engage with the body 12, roof materials 201, and nail-able roof deck materials 202.

Preferably, the width dimension W2 of the medial apertures 22 may be less than the width dimension W4 of the thread crest 61, so that when an auger element 51 is inserted and rotated in a medial aperture 22, the thread 61 may engage the body 12 forming the medial aperture 22. In further preferred embodiments, the medial apertures 22 may comprise a width dimension W2 that is greater than the width dimension W3 between the first end 53 and second end 54 and the width dimension W2 of the medial aperture 22 may also be less than the width dimension W4 of the thread crest 61 between the first end 53 and the second end 54. In this manner, the width dimension (W2) of the medial aperture 22 may be less than the width dimension (W4) of the thread crest 61 and greater than the width dimension (W3) of the thread root 52.

Preferably, the width dimension W1 of the central aperture 21 may be less than the width dimension W4 of the thread crest 61, so that when an auger element 51 is inserted and rotated in the central aperture 21, the thread 61 may engage the body 12 forming the central aperture 21. In further preferred embodiments, the central aperture 21 may comprise a width dimension W1 that is greater than the width dimension W3 of the thread root 52 between the first end 53 and second end 54 and the width dimension W1 of the central aperture 21 may also be less than the width dimension W4 of the thread crest 61 between the first end 53 and the second end 54. In this manner, the width dimension W1 of the central aperture 21 may be less than the width dimension W4 of the thread 61 and greater than the width dimension W3 of the thread root 52.

As perhaps best shown in FIGS. 13-15, an auger element 51 may be comprise a thread crest 61 that extends from the second end 54 towards the first end 53 which is configured to provide an aggressively threading. The thread root 52 and/or thread crest 61 may be formed from or comprise metal or other rigid material and may be embossed with an aggressive, non-standard, wide pitch thread crest 61 and a piercing tip 56. As an auger element 51 is being installed by rotation, the aggressive, non-standard, wide pitch of the thread 60 and the width dimension W3 of the thread root 52 are designed such to displace a minimal amount of roof materials 201 (FIG. 6) and nail-able roof deck materials 202 (FIG. 6) during installation. The minimal amount of roof materials 201 and nail-able roof deck materials 202 displaced by rotary installation of the auger element 51 is suitably received by the thread 61 and is uniformity conveyed along the thread path of the augers element 51 into the roof materials 201 and nail-able roof deck materials 202. This is accomplished along the thread 61 engagement path without damaging the surrounding structure of roof materials 201 and nail-able roof deck materials 202. The tip 56 of the auger element 51 may be further designed with a piercing point, such as with a taper of between 20 and 40 degrees relative to the thread root 52 and/or thread crest 61, which allows the thread path of the rotating auger element 51 to develop quickly and non-destructively upon entry into the roof materials 201 and nail-able roof deck materials 202.

The thread patterns of common, standard, commercially available screw parts tend to simply bore into these nail-able roof deck materials 202 and therefore do not create a sound thread path. This results in installations with minimal to no withdrawal resistance from the nail-able roof deck materials 202. The disclosed auger elements 51 which may be used with the fastener 100 uniquely and uniformly conveys the roof materials 201 and nail-able roof deck materials 202 displaced during rotary installation of the auger elements 51 and compacts the material 201, 202, along a well-defined thread path created by the thread 61. This affirms a secure, consistent embed within the nail-able roof deck materials 202 by fortifying the path of the thread 61 in the nail-able roof deck material 202 along the thread engagement.

Figure 16:
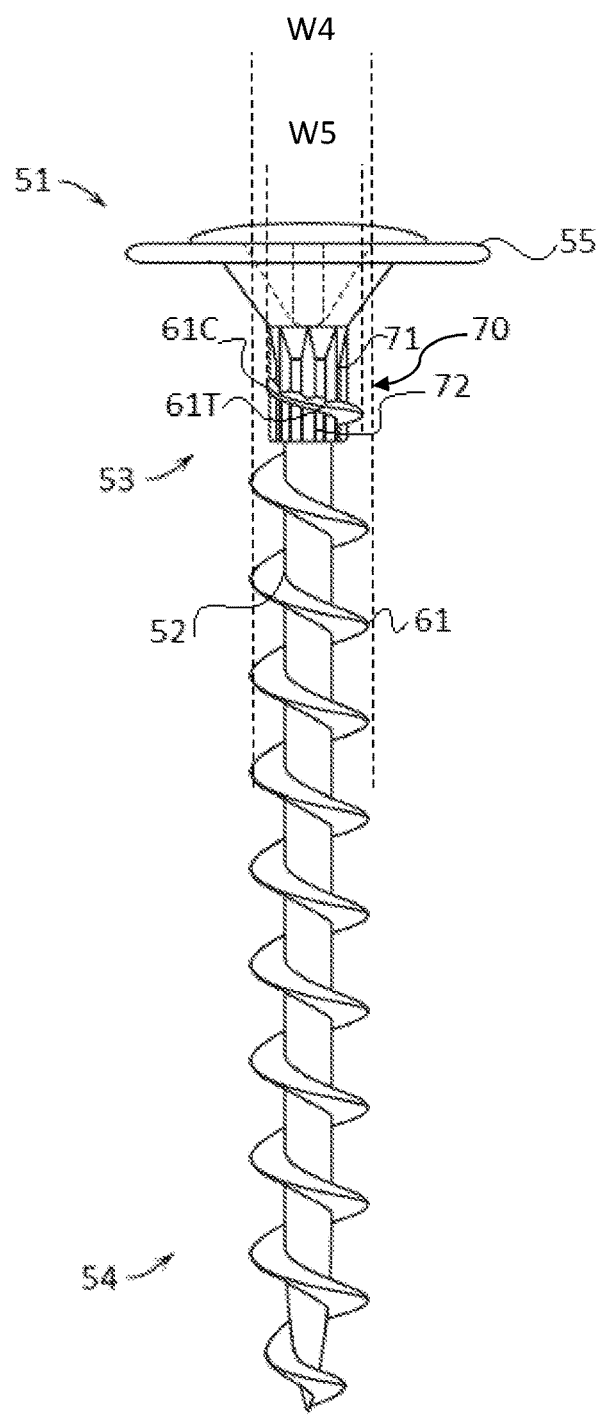
FIG. 16 shows one example of an auger element comprising auger splines proximate to the auger head in accordance with alternative embodiments described herein.
Figure 17:
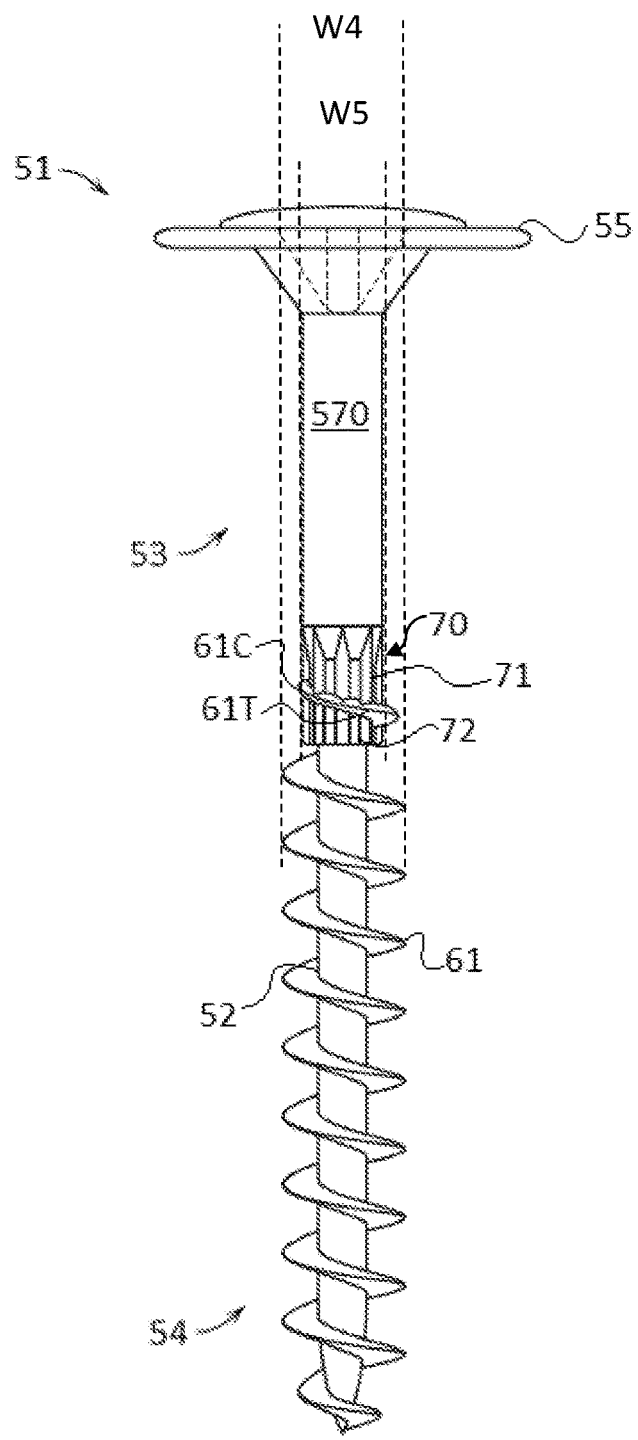
FIG. 17 shows one example of an auger element having an unthreaded upper shank and comprising auger splines below the unthreaded upper shank in accordance with alternative embodiments described herein.

Referring now to FIG. 16 and FIG. 17. FIG. 16 shows one example of an auger element 51 comprising auger splines 70 proximate to the auger head 55 while FIG. 17 shows one example of an auger element 51 having an unthreaded upper shank 570 and comprising auger splines 70 below the unthreaded upper shank 570 in accordance with alternative embodiments described herein. In these alternative embodiments and examples, an improved auger element 51 is shown comprising shank 57 having a first end 53 coupled to a head 55 and a second end 54 having a tip 56. A thread with a root 52 and crest 61 is positioned along the auger element 51. The thread root 52 having a third width (W3) and the thread crest 61 protruding outwardly away from the root 52 and having a fourth width (W4). In this example, a plurality of auger splines 70 such as two, three, four, or more auger splines 70 are positioned along the first end 53 below the head 55. The plurality of auger splines 70 may comprise or otherwise be made up of spline ridges 71 positioned adjacent to spline valleys 72. Spline ridges 71 may, in some embodiments, be shaped as peaks either rounded or pointed or otherwise protruding outwardly away from the auger 51 while spline valleys 72 may, in some embodiments be shaped as "V" or "U" shaped valleys and formed proximate to and in-between spline ridges 71. In some embodiments, the auger 51 may comprise splines 70 to strengthen the auger 51 during the machining and manufacturing process allowing these parts to emerge from roll forming with a certain degree of straightness.

Still referring to FIG. 16 and FIG. 17, the auger element 51 may further comprise a tapered thread 61T positioned around or about the auger splines 70 and having a maximum fifth width (W5) which is less than the fourth width (W4) of the thread crest 61. In this embodiment, the tapered thread 61T becomes tapered and flush with a spline ridge 71 at a top tapered crest 61C near the top of the auger splines 70 (e.g. closer to the head 55 than the tip 56).

Referring now to just FIG. 17, shown here is an embodiment of the auger element 51 whereby the auger element 51 comprises an elongate unthreaded upper shank 570 area positioned between the head 55 and auger splines 70. The auger splines 70 comprising spline ridges 71 positioned adjacent to spline valleys 72 and the unthreaded upper shank 570 is substantially void of auger splines 70 and threading with thread crests 61.

As provided by example in Table 1 below, the roof cover fasteners 100 as provided herein provide superior withdrawal resistance compared to similar products known in the art.

TABLE 1

COMPARATIVE FASTENER WITHDRAWAL RESISTANCE RATES FROM CELLULAR CONCRETE

| Fastener | Withdrawal Resistance in Lbs/Force [1] | | | | Average | Std Deviation |
|---|---|---|---|---|---|---|
| OMG CR [2] | 130 | 150 | 160 | 190 | 157.5 | 25 |
| FM - 90 [2] | 180 | 180 | 180 | 190 | 182.5 | 5 |
| Twin-Loc [3] | 160 | 150 | 180 | 180 | 167.5 | 15 |
| TriFixx [4] | 300 | 300 | 350 | 300 | 312.5 | 25 |
| Invent - 2 [5] | 350 | 325 | 350 | 350 | 343.75 | 12.5 |
| Invent - 3 [6] | 550 | 525 | 550 | 550 | 543.75 | 12.5 |
| Invent - 4 [7] | 675 | 700 | 700 | 700 | 693.75 | 12.5 |

Colum Descriptions:
Label [1] ANSI/SPRI FX-1 2011, Standard Field Test Procedure for Determining Withdrawal Resistance for Roofing Fasteners
Label [2] Related Invention (similar to Young patent U.S. Pat. No. 4,627,207)
Label [3] Barker patent U.S. Pat. No. 6,095,737
Label [4] Murphy patent U.S. Pat. No. 5,709,059
Label [5] Presently disclosed fastener 100 with plate 11 and two augers 51
Label [6] Presently disclosed fastener 100 with plate 11 and three augers 51
Label [7] Presently disclosed fastener 100 with plate 11 and four augers 51

It should be noted that the parts identified as Label (2) similar to Young U.S. Pat. No. 4,627,207, have a pair of sheet metal legs beneath the nail head that are single blow impact driven into the parent cellular concrete. Their resistance to withdrawal results from embedded frictional contact within the cellular concrete and the diverging design of the fastener legs. The Twin-Loc part, (Barker U.S. Pat. No. 6,095,737), is likewise impact driven into the parent cellular concrete, then with a second blow, a pair of wire anchors, situated at the base of the parts shank, deploy horizontally outward within the cellular fill, anchoring the part with mechanical resistance to withdrawal. The aforementioned parts are used as supplied and are not contemplated by design to provide a per part means of enhanced attachment to the deck material for withdrawal resistance.

It should be further noted that the Tri-Fixx (Murphy U.S. Pat. No. 5,709,050) is a light gauge steel plate with an outer circumference embossment, with dimples positioned with triaxiality around the embossments inner boundary. A minimum of (3) per part common galvanized nails are driven through the light gauge plate at the dimpled locations, outwardly, at an approximate 50° angle into the parent deck material. Notably, the angle of the fasteners embedded parts, which is the mechanical key to the fasteners withdrawal resistance, is not determined by the fastener parts design. Instead it is determined by installer positioning making installation variability likely and probable. Additionally, the installer and the driving tools used must manipulate around the part for positioning during installation to achieve proper outward angular positioning of the embedded nails.

In some embodiments of the present invention, the plate 11 of the fastener 100 is contemplated by design to receive as few as (1) and as many as (8) auger elements 51, allowing a very wide range of per part fastener withdrawal resistance values to be achieved based upon installation. In the table above, two (labeled as "Invent-2), three (Invent 3) and four (Invent-4) auger elements 51 are used to demonstrate this feature. This noted installation variability feature is something not contemplated by the other related inventions. Also shown in table 1, even when using a minimum number of augers elements 51, the fastener 100 has superior comparative withdrawal resistance with an average greater than 325 Lbs/Force and in some cases greater than 340 Lbs/Force. Further notable, the auger elements 51 may be rotary power tool installed, without impact, at a 90° angle relative to the plate 11 and parent deck, making simple overhead, one position installation possible as compared to the installation of Murphy (U.S. Pat. No. 5,709,050) for example.

While some materials have been provided, in other embodiments, the elements that comprise the fastener 100 such as the cover plate 11, the auger element 51, and/or any other element described herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the fastener 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the fastener 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the fastener 100 may be coupled by being one of connected to and integrally formed with another element of the fastener 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A roof cover fastener that attaches roof materials to lightweight insulating concrete and other roof deck materials, the fastener comprising
   a. a cover plate, the cover plate comprising:
      a planar body having a perimeter,
      a central aperture disposed centrally in the body,
      a first annular rib formed into the body and encircling the central aperture,
      a second annular rib formed into the body and encircling the first annular rib,
      a first channel separating the first annular rib from the second annular rib, wherein the first annular rib and second annular rib extend above the first channel and wherein the first channel has a flat planar first contact surface, the flat planar first contact surface configured to contact a roof material without penetrating the roof material,
      a first circular shaped medial aperture and a second circular shaped medial aperture disposed in the first channel between the first annular rib and the second annular rib;
   b. a first auger element, the first auger element comprising:
      a first end and a second end,
      a head coupled to the first end,
      a tip coupled to the second end, and
      a thread crest with a thread root extending from the second end towards the first end; and
wherein the first circular shaped medial aperture and the second circular shaped medial aperture are both configured to receive an auger element as it is driven into the roof material.

2. The fastener of claim 1, wherein the first auger element is secured within the first circular shaped medial aperture and a second auger element is secured within the second circular shaped medial aperture.

3. The fastener of claim 2, wherein the first and the second circular shaped medial apertures are symmetrically positioned relative to each other with the central aperture located in-between the first and the second circular shaped medial apertures.

4. The fastener of claim 1, further comprising a second channel formed into the body of the cover plate, and wherein the second channel encircles the central aperture.

5. The fastener of claim 4, further comprising a third channel encircling the second annular rib, and wherein the first annular rib and second annular rib extend above the third channel.

6. The fastener of claim 1, wherein the medial aperture comprises a second width dimension (W2), wherein the thread root comprises a third width dimension (W3), wherein the thread crest comprises a fourth width dimension (W4), and wherein the fourth width dimension (W4) of the thread crest is at least 1.5 times greater than the third width dimension (W3) of the thread root.

7. The fastener of claim 6, wherein the fourth width dimension (W4) of the thread crest is more than 1.8 times the third width dimension (W3) of the thread root.

8. The fastener of claim 6, wherein the fourth width dimension (W4) of the thread crest is more than 2.0 times the third width dimension (W3) of the thread root.

9. The fastener of claim 1, wherein the fastener has an average withdrawal resistance from cellular concrete of greater than 500 Lbs/Force when three auger elements are used in combination with the cover plate.

10. The fastener of claim 1, wherein the fastener has an average withdrawal resistance from cellular concrete of greater than 600 Lbs/Force when four auger elements are used in combination with the cover plate.

11. The fastener of claim 1, wherein the tip is tapered between 15 and 45 degrees relative to the thread root and thread crest.

12. The fastener of claim 1, wherein the first auger element further comprises a plurality of auger splines located proximate to the first end below the head.

13. The fastener of claim 12, wherein the plurality of auger splines comprise spline ridges positioned adjacent to spline valleys.

14. The fastener of claim 12, wherein the plurality of auger splines comprise spline tapered thread positioned within the auger splines.

15. The fastener of claim 14, wherein the spline tapered thread has a maximum crest width which is a fifth width (W5) which is less than a fourth width (W4) of the thread crest.

16. The fastener of claim 14, wherein the tapered thread becomes flush with a spline ridge as it approaches the top of the auger splines near the head causing a top tapered crest to not protrude further outward than a spline ridge at a distal top of the tapered threading.

17. An improved auger element, the auger element comprising:
   a. a shank having a first end coupled to a head and a second end having a tip;
   b. a thread having a thread root and a thread crest, the thread root having a third width (W3) and the thread crest protruding outwardly away from the shank and having a fourth width (W4); and
   c. a plurality of auger splines positioned along the first end of the shank below the head, the plurality of auger splines comprising spline ridges positioned adjacent to spline valleys and the plurality of auger splines further comprising a tapered thread positioned about the plurality of auger splines, the tapered thread having a maximum fifth width (W5) which is less than the fourth width (W4) of the thread crest and the tapered thread becoming flush with a spline ridge and a top tapered crest.

18. The auger element of claim 17, further comprising an unthreaded upper shank positioned between the head and auger splines.

19. The auger element of claim 18, wherein the unthreaded upper shank is void of auger splines and threading.

* * * * *